(12) United States Patent
Utsunomiya (10) Patent No.: US 12,186,761 B2
(45) Date of Patent: Jan. 7, 2025

(54) SPOUT NOZZLE FOR SCUM REMOVAL DEVICE AND WATER CONDUIT WITH THAT SPOUT NOZZLE FOR SCUM REMOVAL DEVICE

(71) Applicant: Utsunomiya Kogyo Co., Ltd., Tokyo (JP)

(72) Inventor: Hideo Utsunomiya, Tokyo (JP)

(73) Assignee: UTSUNOMIYA KOGYO CO., LTD., Tokyo (JP)

( * ) Notice: Subject to any disclaimer, the term of this patent is extended or adjusted under 35 U.S.C. 154(b) by 478 days.

(21) Appl. No.: 17/595,625

(22) PCT Filed: Dec. 8, 2020

(86) PCT No.: PCT/JP2020/045673
§ 371 (c)(1),
(2) Date: Nov. 19, 2021

(87) PCT Pub. No.: WO2022/123652
PCT Pub. Date: Jun. 16, 2022

(65) Prior Publication Data
US 2022/0410181 A1  Dec. 29, 2022

(51) Int. Cl.
*B05B 1/00*  (2006.01)
*B03D 1/14*  (2006.01)
(Continued)

(52) U.S. Cl.
CPC ............ *B05B 1/044* (2013.01); *B03D 1/1462* (2013.01); *B05B 1/323* (2013.01); *B05B 1/326* (2013.01); *C02F 1/40* (2013.01); *C02F 2201/005* (2013.01)

(58) Field of Classification Search
CPC .... C02F 1/00; C02F 1/006; C02F 1/24; C02F 1/40; C02F 3/00; C02F 7/00; C02F 9/00;
(Continued)

(56) References Cited

U.S. PATENT DOCUMENTS 2,259,128 A * 10/1941 Egan ..................... E03F 7/04
137/527.6
4,765,889 A    8/1988 Grujanac

FOREIGN PATENT DOCUMENTS

CN       105351573 A     2/2016
CN       208474568 U     2/2019
(Continued)

OTHER PUBLICATIONS

Search Report dated Nov. 4, 2022, issued by the European Patent Office in related European Application No. 20 93 6096.
(Continued)

*Primary Examiner* — Allison G Fitzsimmons
(74) *Attorney, Agent, or Firm* — ArentFox Schiff LLP (57) ABSTRACT

A spout nozzle for a scum removal device provided in water where scum floats: a tip-end-side nozzle part of a nozzle body is formed in a flat cylindrical shape; a valve body closing a discharging opening by its own weight when pressure water is not supplied is provided in the tip-end-side nozzle part; a closing part closing an opening above the discharging opening when the discharging opening is closed is provided on the valve body; therefore, resistance is small even if it is arranged in water and moreover an interior is hardly stained by scum and the like contained in water.

11 Claims, 7 Drawing Sheets

(51) Int. Cl.
  *B05B 1/04* (2006.01)
  *B05B 1/32* (2006.01)
  *C02F 1/40* (2023.01)
  *C02F 1/00* (2023.01)

(58) Field of Classification Search
  CPC ............ C02F 2103/00; C02F 2103/002; C02F 2103/003; C02F 2103/005; C02F 2201/00; C02F 2201/002; C02F 2201/005; C02F 2307/00; B01D 21/00; B01D 21/0012; B01D 21/0006; B01D 21/0003; B01D 21/0018; B01D 21/0024; B01D 21/0027; B01D 21/0039; B01D 21/003; B01D 21/0033; B01D 21/0042; B01D 21/0087; B01D 21/02; B01D 21/10; B01D 21/24; B01D 21/2405; B01D 21/2433; B01D 21/2438; B01D 21/28; B01D 21/286; B01D 2201/00; B01D 2201/10; B01D 2221/00; B01D 2221/04; B01D 2221/12; B01D 2257/00; B01D 2257/70; B01D 2257/91; E02B 8/00; E02B 13/00; E03F 7/04; F16K 1/00; F16K 1/16; F16K 1/165; F16K 1/18; F16K 1/20; F16K 1/24; F16K 1/30; F16K 1/301; F16K 15/00; F16K 15/02; F16K 15/03; F16K 15/034; F16K 17/00; F16K 17/003; F16K 17/02; F16K 17/12; F16K 17/164; F16K 21/00; F16K 21/04; F16K 27/00; F16K 27/02; F16K 27/0209; F16K 31/12; F16K 31/126
  See application file for complete search history.

(56) References Cited

FOREIGN PATENT DOCUMENTS

| | | |
|---|---|---|
| JP | H07-303884 A | 11/1995 |
| JP | H11-128916 A | 5/1999 |
| JP | 2011-218306 A | 11/2011 |
| JP | 2011-240229 A | 12/2011 |
| JP | 2011-240271 A | 12/2011 |
| JP | 2012-075609 A | 4/2012 |
| JP | 2013-248545 A | 12/2013 |

OTHER PUBLICATIONS

Written Opinion issued by the International Search Authority in related International Patent Application No. PCT/JP2020/045673, dated Feb. 16, 2021.

Communication dated Dec. 14, 2021, issued by the Australian Intellectual Property Office in related Australian Application No. 2020449442.

* cited by examiner

SPOUT NOZZLE FOR SCUM REMOVAL DEVICE AND WATER CONDUIT WITH THAT SPOUT NOZZLE FOR SCUM REMOVAL DEVICE

CROSS-REFERENCE TO RELATED APPLICATIONS

The present application is a National Stage entry of the International Application No. PCT/JP2020/045673, filed Dec. 8, 2020. The disclosure of the priority application is incorporated in its entirety herein by reference.

BACKGROUND OF THE INVENTION

Technical Field

The present invention relates to a spout nozzle for a scum removal device used for the scum removal device, and a water conduit having that spout nozzle for the scum removal device.

Background Art

Patent Document 1 discloses a scum removal device which is appropriate for a final sedimentation basin (there is a case that is called "a second sedimentation basin") in a sewage-treatment plant. Patent Document 2 discloses a spout nozzle for the scum removal device which is appropriate for this scum removal device. These Patent Documents 1 and 2 are both concerned with the present applicant and also patented. Especially, the scum removal device concerned with Patent Document 1 is put into use under a nickname "Hiichi-Kun" (registered trademark).

The scum removal device concerned with Patent Document 1 is structured to spout pressured water from a spout nozzle provided in water near the water surface of the final sedimentation basin and remove the scum by moving the scum floating on a water surface toward a pipe skimmer side. In this scum removal device, a gentle flow is to be made on the surface water by the spout water from the spout nozzle. Moreover, the scum is taken on the gentle flow of the surface water to be drained into the pipe skimmer. Because raw water flowed into the final sedimentation basin is subjected to a biological process, the generated scum is subdivided even in a minor turbulence, i.e., it becomes so-called pin floc, so that it is merged into the raw water and it becomes difficult to remove the scum; therefore, the flow is made gentle like this.

The spout nozzle for the scum removal device of the above-mentioned Patent Document 2 is appropriate for the above-mentioned spout nozzle, and the structure is characterized by providing a closing member which closes an opening where pressure water spouts by buoyant force while the pressure water does not spout out, i.e., until a stage of removing the scum comes. Accordingly, this spout nozzle for the scum removal device has an advantage of preventing fouling of the inside while the pressure water is not supplied.

Meanwhile, a sewage-treatment plant has a plurality of primary sedimentation basins (there is a case in which these are called "first sedimentation basins") which are parallelly provided. To each primary sedimentation basin, the raw water is distributed and supplied from one water conduit (there is a case in which it is called an "inlet conduit").

In this raw water supplied to the water conduit, floating subjects are contained other than sedimentation subjects which are processing objects in the primary sedimentation basin, since the raw water is sewage. Accordingly, on the water surface of the water conduit, scum in a cluster state of the floating subjects is generated. When a thickness of a layer of the generated scum reaches about 10 cm for example, the scum is subjected to removal. The removal of the scum is performed by discharging to scum pits (there is a case in which these are called "discharging pits") provided at a side where the raw water is supplied to the water conduit and an opposite side. The discharge of the scum disclosed in Patent Document 3 is performed by flowing surface water containing the scum layer into the scum pits by opening movable gates provided between the water conduit and the scum pits.

CITATION LIST

Patent Literature

Patent Document 1: Japanese Unexamined Patent Application, First Publication No. 2010-046622
Patent Document 2: Japanese Unexamined Patent Application, First Publication No. 2011-240229
Patent Document 3: Japanese Unexamined Patent Application, First Publication No. 2011-218306

SUMMARY OF INVENTION

Technical Problem

However, since the removal of the scum in the water conduit disclosed in the above-described Patent Document 3 is performed by discharging the scum to the scum pit along with the flow of the surface water, it is not smooth only by the flow of the surface water if the scum is hardened or if the scum adheres to the inner wall of the water conduit.

Therefore, an object of the present invention is to discharge the scum smoothly to the scum pit.

Solution to Problem

The Applicant of the present invention has previously proposed a water conduit which can efficiently discharge scum to a scum pit in Japanese Patent Application No. 2020-152897.

The water conduit concerned with the proposal is provided with a water jet nozzle which is located above scum and shoots pressure water to push the scum out toward a scum pit, a spout nozzle which is located in water below the scum and spouts pressure water to push the scum out toward the scum pit, and a compressed-air spouting structure which is located on an inner wall of the water conduit and spouts compressed-air along the inner wall to tear the scum from the inner wall.

The water conduit concerned with the proposal has characteristics of smoothly discharging the scum to the scum pit since the pressure water is shoot to push the scum out toward the scum pit from the upper side and the lower side of the scum and peeling the scum from the inner wall of the water conduit.

However, since the flow in the water conduit is fast, differently from the final sedimentation basin as described above, it is necessary to device not to intercept the water flow in the water conduit to the utmost; and moreover, since the quantity of the scum is large, it is also necessary to device not to miss the operation owing to the adhesion of the scum and the like. Therefore, it is desired to further improve the spout nozzle for the scum removal device located in water.

A spout nozzle for a scum removal device according to the present invention is a spout nozzle for a scum removal device which removes scum by spouting pressure water in water where the scum floats, having a nozzle body having an inlet-side housing part into which the pressure water is supplied, and a tip-end-side nozzle part communicated with the inlet-side housing part and formed into a flat cylindrical shape in which a width is larger than a height, and a valve body provided in the tip-end-side nozzle part of the nozzle body and can open/close an opening of the tip-end-side nozzle part;

in the spout nozzle, the valve body has a valve main body part formed in a plate shape; a base end part of the valve main body part is rotatably held on a vicinity of an upper wall of a base end part of the tip-end-side nozzle part via a hinge shaft along the width direction; a tip end of the valve main body part is arranged in an opening of the tip-end-side nozzle part, with being vertically movable between a position of forming an upper opening above the valve main body part by being in contact with an upper surface of a lower wall of the tip-end-side nozzle part and a position forming a lower opening below the valve main body part by being in contact with a lower surface of an upper wall of the tip-end-side nozzle part; the valve main body part has a weight of being rotated downward by its own weight and close the lower opening when the pressure water is not supplied to the inlet-side housing part and of being rotated upward by a pressure of the pressure water and open the lower opening when the pressure water is supplied, a closing part is provided at the tip end part of the valve main body part to stand up upward at a position of protruding from the opening, the closing part is formed in size of closing the upper opening formed between the valve body and the lower surface of the upper wall of the tip-end-side nozzle part when the valve body closes the lower opening.

It is preferable that the tip-end-side nozzle part and the valve body be formed in a shape in which width is gradually larger toward an opening.

It is preferable that the lower opening have a channel cross-sectional area smaller than a maximum channel cross-sectional area of the inlet-side housing part.

It is preferable that the nozzle body and the valve body be formed from synthetic resin and the valve body is provided with a sinker.

It is preferable that the tip-end-side nozzle part incline to turn the opening diagonally upward regarding a horizontal direction.

A water conduit according to the present invention is provided with the above-described spout nozzle for a scum removal device.

It is preferable that a water conduit body and a scum pit be provided to be connected to each other, and the water conduit body be provided with at least either one of a water spout nozzle spouting pressure water toward an upper surface of a generated scum layer to help a flow of the scum layer toward the scum pit, and an air jet mechanism which jets out compressed air toward the scum layer from a lower position than the scum layer and an inner of a side wall of the water conduit body.

Advantageous Effects of Invention

The spout nozzle for a scum removal device of the present invention has small resistance even if it is installed in water since the tip-end-side nozzle part is formed in the flat cylindrical shape and the valve body is putted in it; and the structure does not need a power source and is simple, since the valve body closes the lower opening of the valve body to be the discharging opening by its own weight when the pressure water is not spouted. Moreover, since the closing part is provided at the valve body, it is possible to close the upper opening formed between the valve body and the upper wall of the tip-end-side nozzle part in a state in which the lower opening is closed, and it is possible to prevent the scum and the like from entering inside, to prevent stain, and smoothly rotate the valve body. The water conduit in which this spout nozzle for a scum removal device is provided can discharge the scum smoothly.

DESCRIPTION OF EMBODIMENTS

Before explaining a specific structure of a spout nozzle N (hereinafter, it is called "spout nozzle") for a scum removal device according to one embodiment of the present invention, a water conduit 1 provided with the spout nozzle N is explained using FIG. 1 to FIG. 3.

The water conduit 1 is configured including a water conduit main body 2 and a scum pit 3 in a state of being connected to the water conduit main body 2. The water conduit main body 2 presents a top-open type long water path and configured so that raw water consists of sewage is supplied (refer to the arrow "a") from one end side of its longitudinal direction (the right end side in the illustrated example).

The scum pit 3 is provided at a final end side (the left end side in the illustrated example) in a flow direction of the raw water of the water conduit main body 2; a part of a wall surface forming the scum pit 3 and a wall surface forming the final end side of the water conduit main body 2 are shared. A height of an upper wall surface 3a of the shared wall surface is determined to be a bit lower than a water surface in the water conduit main body 2 (refer to FIG. 2). On a side at the water conduit main body 2 of the wall surface where the upper wall surface 3a is provided, a movable gate 4 is provided to be configured so that the raw water can be controlled to flow into the scum pit 3 from the water conduit main body 2.

Figure 1:
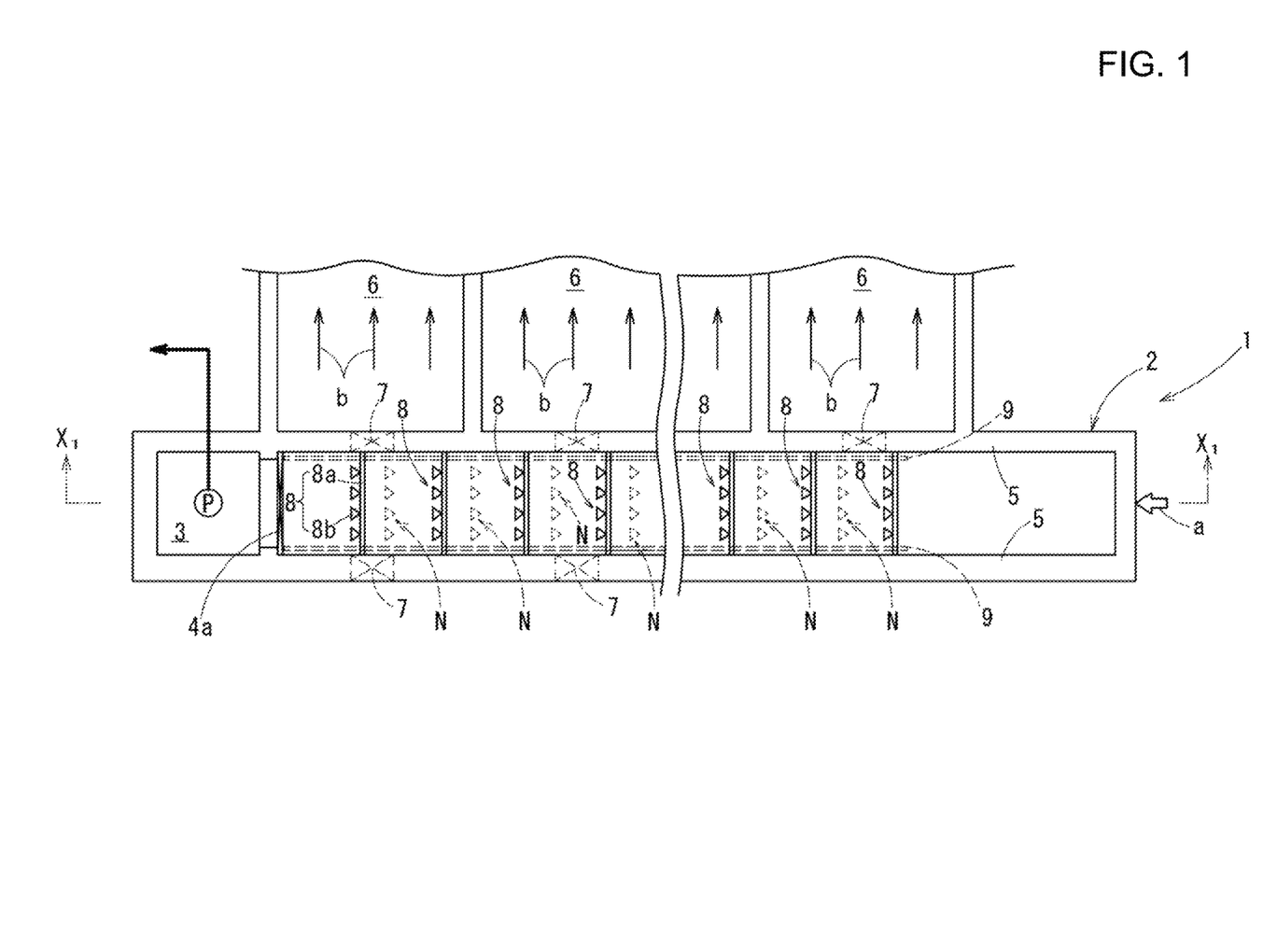
FIG. 1 is a plan view showing a water conduit provided with a spout nozzle for a scum removal device according to one embodiment of the present invention and a part of a sedimentation basin in a state of being connected to this water conduit.
Figure 2:
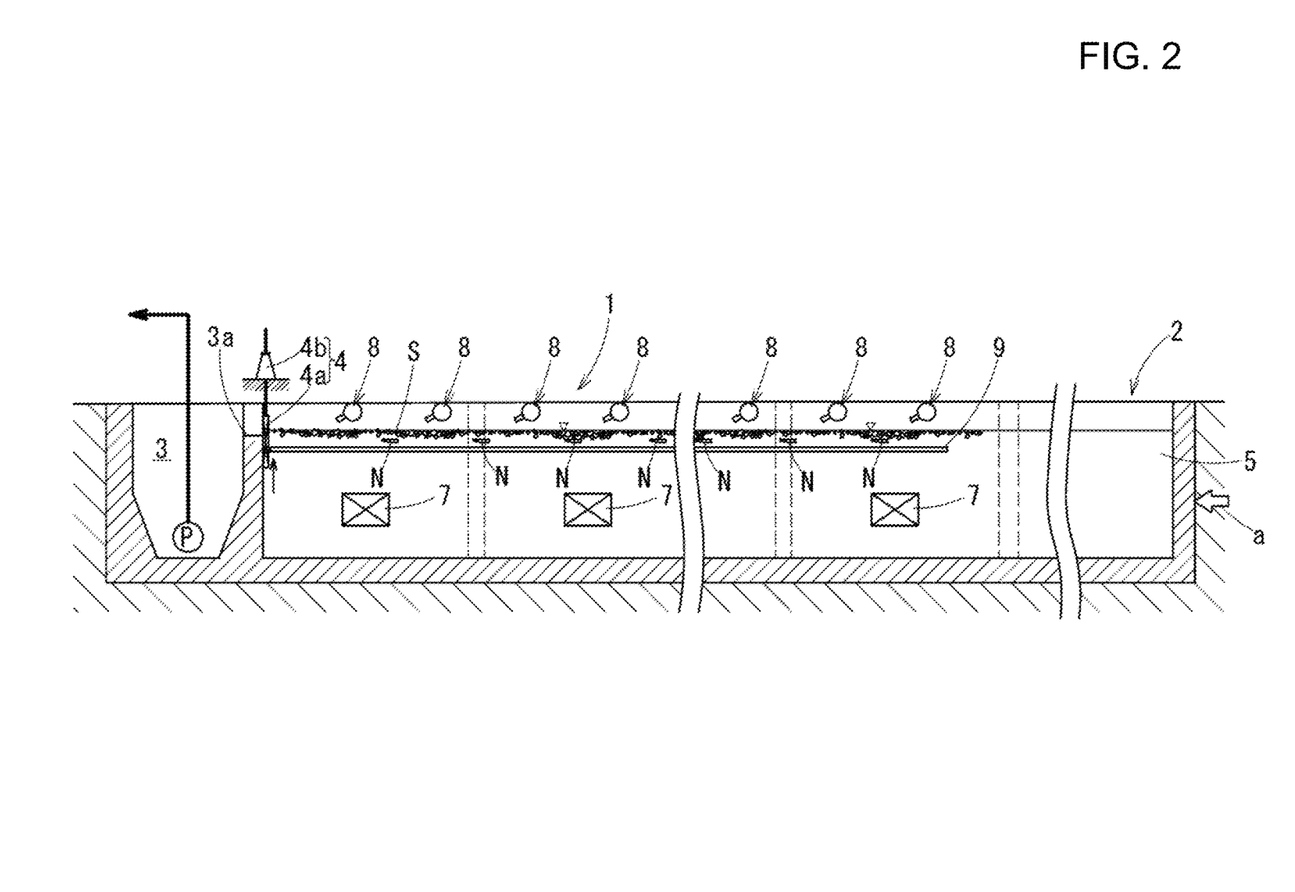
FIG. 2 is a cross sectional view along the line X1-X1 in FIG. 1 showing a state in which a movable gate is closed.
Figure 3:
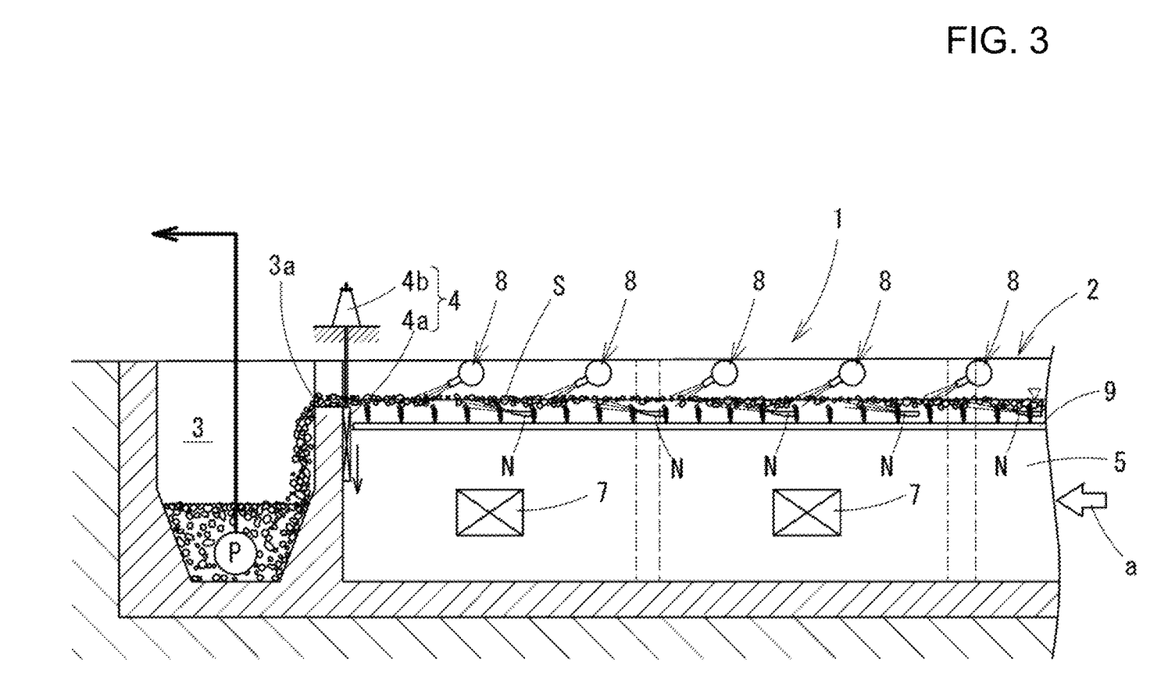
FIG. 3 is a cross sectional view along the line X1-X1 in FIG. 1 showing a state in which the movable gate is open.

The movable gate 4 is composed by including a gate plate 4a and a drive device 4b which is omitted in FIG. 1 and composed so as to be closed as shown in FIG. 2 when scum S is not discharged from the water conduit main body 2 into the scum pit 3, and be open as shown in FIG. 3 when the scum S is discharged in the scum pit 3 from the water conduit main body 2. Accordingly, when the movable gate 3 is open as shown in FIG. 3, the surface water of the water conduit main body 2, i.e., the raw water including the scum S can be discharged into the scum pit 3.

A width of the gate plate 4a is a bit smaller than a channel width of the water conduit main body 2; and its height is determined to be sufficiently larger than a difference between a position of the upper wall surface 3a and a water surface position in the water conduit main body 2. The drive device 4b is composed to move the gate plate 4a up and down: a known up/down movement device such as a system formed from a screw rod and a rotary nut, a rack and pinion system, or the like is applied.

When the scum S is not discharged, as shown in FIG. 2, the drive device 4b lifts the gate plate 4a so that an upper end position of the gate plate 4a is sufficiently higher than the water surface position in the water conduit main body 2 to shut between the scum pit 3 and the water conduit main body 2. When the scum S is discharged, as shown in FIG. 3, the drive device 4b brings the gate plate 4a down so that the upper end position of the gate plate 4a is lower than the water surface position in the water conduit main body 2 and also a bit lower than a bottom surface position of the scum S generated in this water conduit main body 2, so that the scum pit 3 and the water conduit main body 2 can be communicated with each other.

Outside one side wall 5 of a longitudinal direction of a long water path forming the water conduit main body 2, a plurality of sedimentation basin 6 which are primary sedimentation basins in the sewage-treatment plant are parallelly provided.

A part of the side walls of the sedimentation basins 6 are composed of the side walls 5 of the water conduit main body 2. A flow inlet 7 with an open/close door (not shown) is provided at substantially an intermediate height position of the side walls 5. Therefore, the interior of the water conduit main body 2 and the interior of the sedimentation basins 6 are composed to be communicated to each other through this flow inlet 7. Accordingly, when the open/close door of the flow inlet 7 is open, the raw water in the water conduit main body 2 flows into the sedimentation basins 6, and the raw water which flowed-in can flow in the sedimentation basins 6 toward the direction departing from the side walls 5 (refer to the arrow "b" in FIG. 1). In addition, although the sedimentation basins 6 are disposed alongside outside the one side wall 5 of the water conduit main body 2 in the illustration example, these may be disposed alongside outside both side walls 5.

In the water conduit main body 2, a plurality of water jet nozzles 8 composed by including a water supply pipe 8a and a nozzle 8b are provided. The plurality of the water jet nozzles 8 are provided at a bit higher than the water surface in the water conduit main body 2 and to partition the length of the flow direction of the water in the water conduit main body 2 at a prescribed interval.

The water supply pipes 8a are provided between the side walls 5 of the water conduit main body 2 facing to each other to be perpendicular to a longitudinal direction of the water conduit main body 2. To the water supply pipes 8a, water is supplied with a prescribe pressure through a pump which is not shown. The processed water of the sewage-treatment plant can be used for the water supplied to the water supply pipes 8a.

The nozzles 8b are provided with keeping a prescribed interval in a longitudinal direction of the water supply pipes 8a so that a tip-end opening is downward at a lower section of the water flow in the water conduit main body 2. Therefore, when the pressure water is supplied to the water supply pipes 8a, spout water is supplied to the layered scum S generated on the surface layer of the water conduit main body 2 from the nozzles 8b to help the flow of the scum S about to flow toward the scum pit 3 (refer to FIG. 3). Note that, in the present invention, the scum S grown up to have some degree of thickness on the water surface may be sometimes called as a "scum layer S" for convenience of explanation.

On this water conduit main body 2, the spout nozzles (the spout nozzle for a scum removal device of the present invention) N are provided. The plurality of the spout nozzles N are provided in water a bit lower than the water surface in the water conduit main body 2 with a prescribed interval in the flowing direction of the water in the water conduit main body 2. The plurality (four in the example shown in FIG. 1) of the spout nozzles N are also provided keeping a prescribed interval with each other along a direction perpendicular to a flow direction of the water in the water conduit main body 2, i.e., in a channel width.

The spout nozzles N are disposed in water being supported by pressure water supply pipes which are not illustrate. When the pressure water is supplied to the spout nozzles N from the pressure water supply pipes, the spout nozzles N spout the pressure water from the openings facing toward the scum pit 3 side and can help the flow of the scum S about to flow toward the scum pit 3 (refer to FIG. 3). the processed water of the sewage-treatment plant can be used for the water supplied to the spout nozzles N.

Air spout devices 9 are provided on the water conduit main body 2. The air spout devices 9 are formed from a pipe and horizontally provided along flow direction in the water conduit main body 2 inside both side walls 5 of the water conduit main body 2 by supporting devices which are not illustrated (refer to FIG. 1 to FIG. 3). The air spout devices 9 are provided to be below the scum layer S generated in the water conduit main body 2. For instance, in a case in which to discharge the scum S from the water conduit main body 2 into the scum pit 3 if the scum S stays and grows to near 10 cm in its thickness by the operation of the water conduit 1, the air spout device 9 is located a bit lower than 10 cm from the water surface. The location position of the air spout devices 9 is different according to the sewage-treatment plant where the water conduit main body 2 is installed; anyway, it is decided to be below the generated scum S.

Since the present applicant has already suggested this air spout devices 9 in Japanese Patent Application No. 2020-152897, detailed explanation is omitted: one configured by forming a large number of slits on a pipe made of elastomer such as natural rubber, synthetic rubber or the like with an interval in a length direction, one configured by forming a large number of holes on a pipe made of steel with an interval in a length direction, or the like can be adopted. One can also applicable which can prevent clogging by providing the holes of the steel pipe downward and attaching blow-out members in a cup-shape, a bowl-shape, or the like on each hole having an opening opens downward. By the air spout devices 9, when the compressed air is supplied into the pipe, it is emitted as air bubbles in the raw water from the slits or the holes. The emitted air bubbles rise along the inner surface of the side walls 5 and can peel the scum layer S off adhered to the side walls 5.

Next, the spout nozzle N will be explained with FIG. 4 to FIG. 8.

A nozzle body 10 is provided with an inlet-side housing part 11 made of synthetic resin such as polycarbonate into which the pressure water is supplied, and a tip-end-side nozzle part 12 communicated with the inlet-side housing part 11 and formed into a flat cylindrical shape having a width larger than a height. Disposing the flat tip-end-side nozzle part 12 in the water conduit main body 2 toward the downstream side in the flow direction, it is considered not to be a resistance of the water flow as possible.

Figure 4:
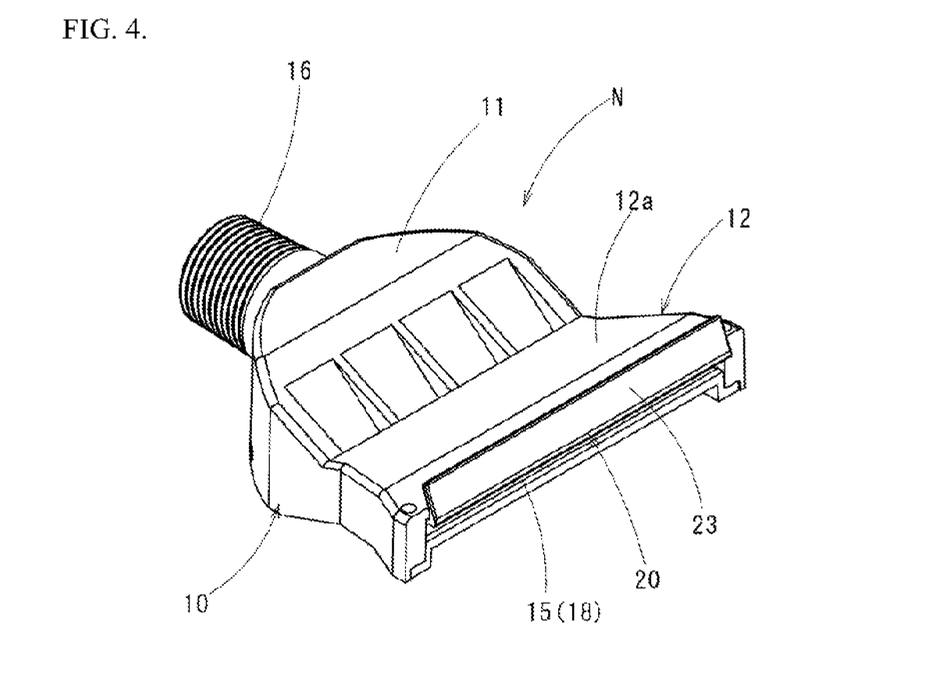
FIG. 4 is a perspective view of a spout nozzle for a scum removal device according to one embodiment of the present invention.
Figure 5:
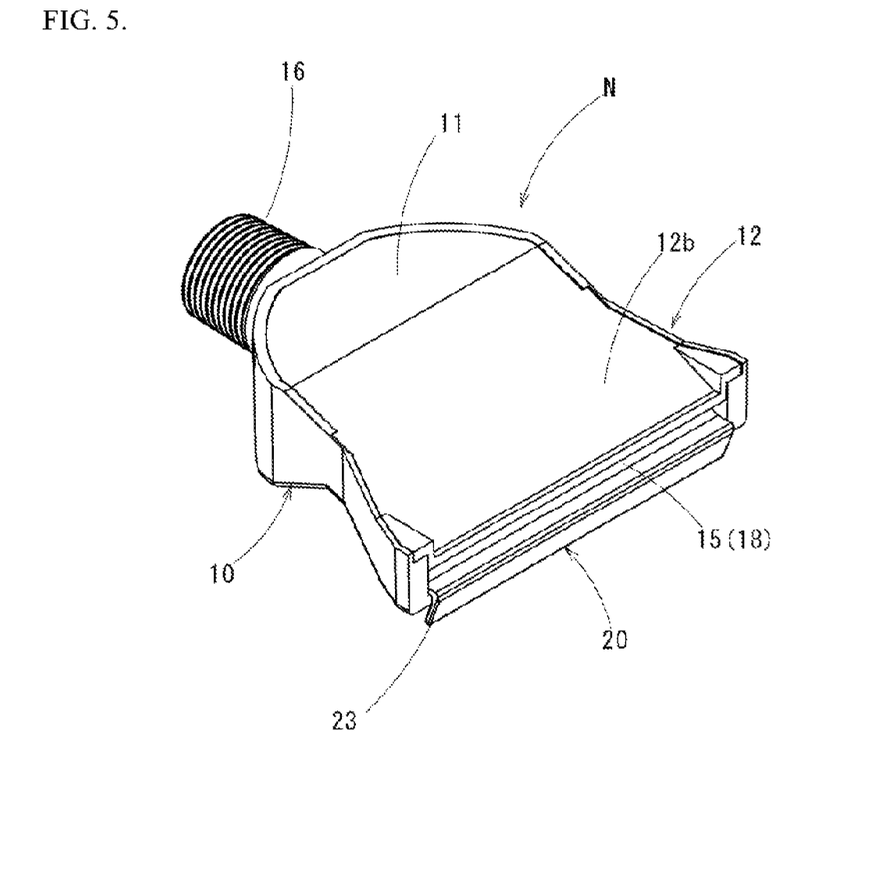
FIG. 5 is a perspective view viewed from a back side of the spout nozzle for a scum removal device shown in FIG. 4.
Figure 6:
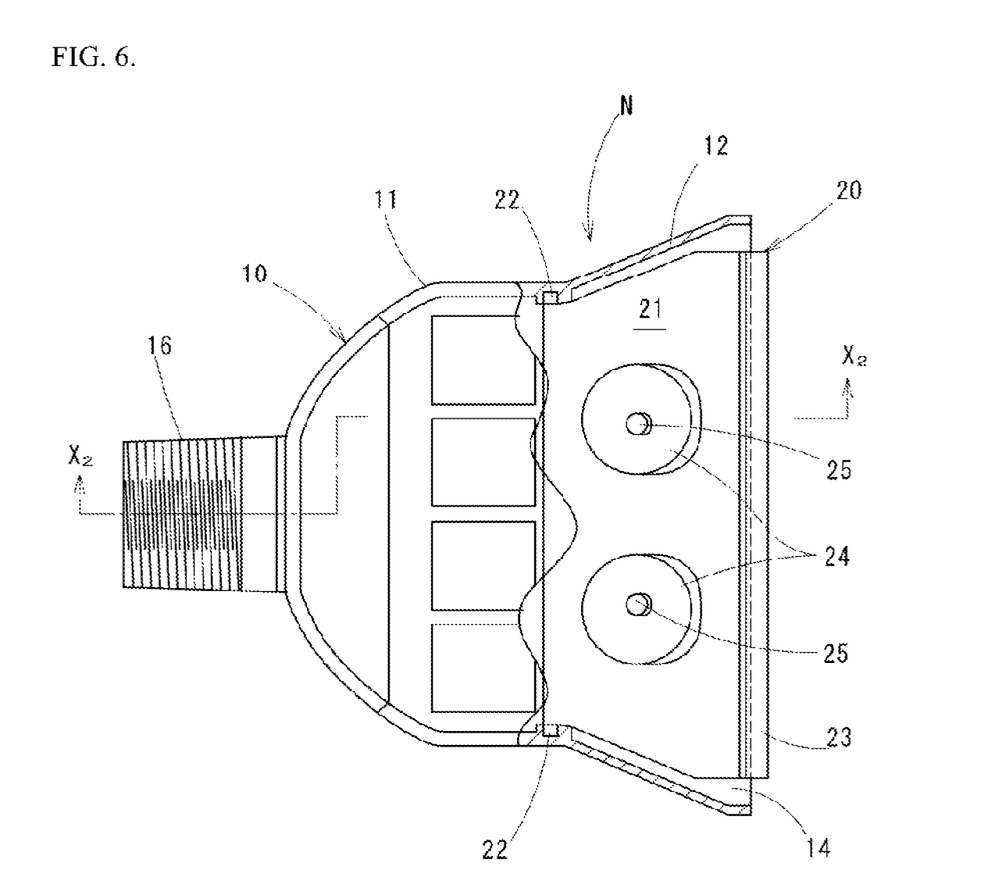
FIG. 6 is a plan view showing an inner structure by breaking a part of the spout nozzle for a scum removal device according to one embodiment of the present invention.

A planar shape of the nozzle body 10 is formed to have a broader width at the tip end side than at the base end side (at the right side than at the left side in FIG. 6) as shown in FIG. 4 to FIG. 6. The tip-end-side nozzle part 12 is formed to have a width dimension gradually larger toward the tip end. The tip end of the tip-end-side nozzle part 12 is formed as shown in FIG. 7 and FIG. 8, to be inclined at an angle about 20° regarding the inflow direction of the pressure water in the inlet-side housing part 11 so as to be a bit upward in the water.

Figure 7:
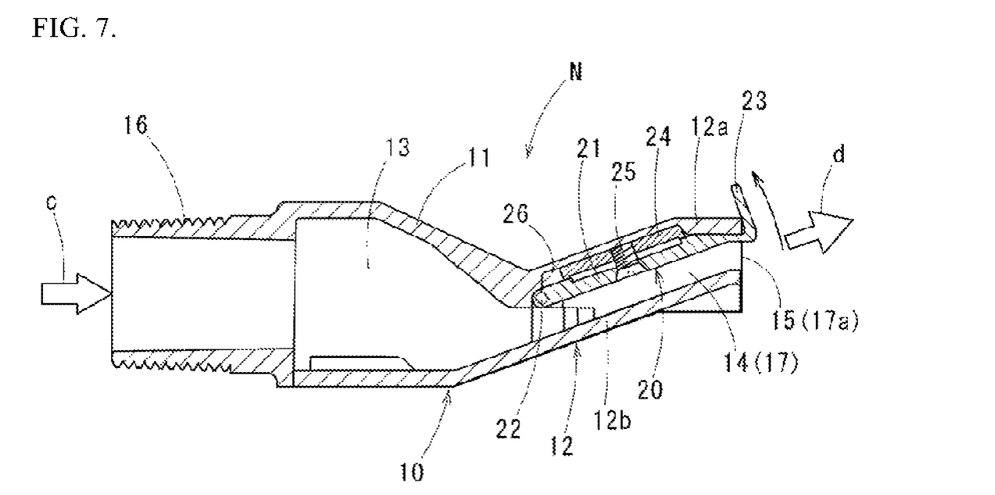
FIG. 7 is a cross sectional view along the line X2-X2 in FIG. 5 showing a state in which pressure water spouts from the spout nozzle for a scum removal device.
Figure 8:
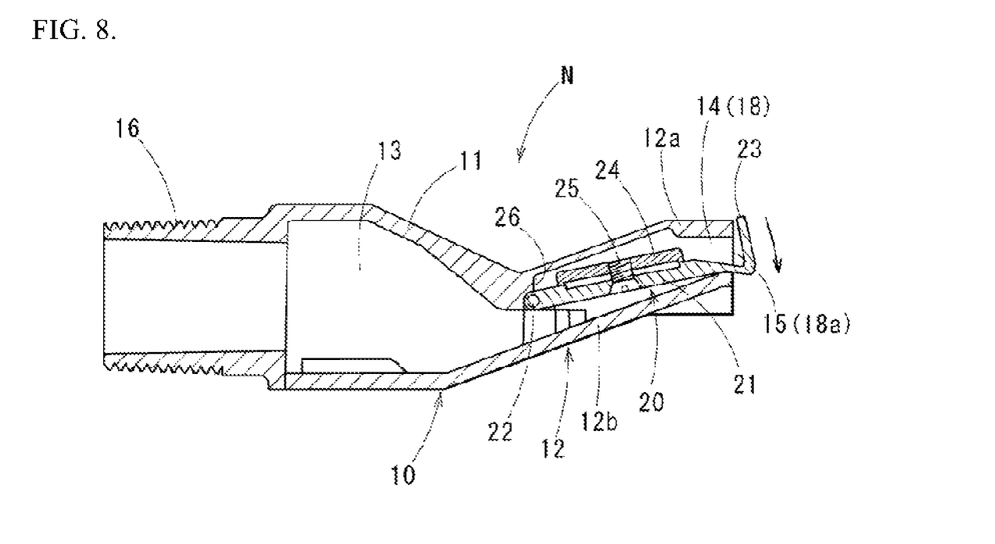
FIG. 8 is a cross sectional view along the line X2-X2 in FIG. 5 showing a state in which the pressure water does not spout out.

The inside of the nozzle body 10 is formed as one space as shown in FIG. 7 and FIG. 8; the space is separated into a pressure water chamber 13 in the inlet-side housing part 11 and a valve body storing chamber 14 in the tip-end-side nozzle part 12. The pressure water chamber 13 has a large volume; the valve body storing chamber 14 has a flat shape in which a width is larger than a height and is formed to be larger in the width toward the tip end.

On an end surface at the broader width side of the tip-end-side nozzle part 12 in the nozzle body 10, an opening 15 is provided to open the valve body storing chamber 14 to the exterior. The opening 15 extends over the entire end surface at the broader width side, and the shape of the opening 15 shows a slit shape. The nozzle body 10 is provided so that the longitudinal direction of the opening 15 is parallel to the water surface in the water conduit main body 2 and also perpendicular to both side surfaces 5 when it is installed on the water conduit main body 2 shown in above-described FIG. 1 to FIG. 3.

On the base end part of the inlet-side housing part 11, an installing part 16 is integrally provided (refer to FIG. 4 to FIG. 6). The installing part 16 shows a pipe shape having thread groove around itself and an interior space of the installing part 16 is communicated with the pressure water chamber 13 as shown in FIG. 7 and FIG. 8. The installing part 16 is formed to be able to screw with a screw hole formed in a pressure water supply pipe which is not illustrated by a screw groove.

The valve body storing chamber 14 stores a valve body 20 inside. The valve body 20 is provided with a valve main body part 21, a hinge shaft 22, a closing part 23, and sinkers 24. The valve main body part 21, the hinge shaft 22, and the closing part 23 are formed integrally of synthetic resin such as polycarbonate similarly to the nozzle main body 10.

The valve main body part 21 is formed in a plate shape having a size which can move up and down in the valve body storing chamber 14 of the tip-end-side nozzle part 12; a plate thickness thereof is formed to be smaller than a thickness of the valve body storing chamber 14, e.g., a thickness equal to or smaller than the thickness of the valve body storing chamber 14. The width of the valve main body part 21 is formed so as to be gradually increased toward the tip end suitably to the valve body storing chamber 14 in the tip-end-side nozzle part 12.

On both sides of the base end part of the valve main body part 21, the hinge shafts 22 and 22 are horizontally provided to project to both sides. These hinge shafts 22 and 22 are rotatably held in the vicinity of the center part of the nozzle main body 10, at both sides near an upper wall 12a at the base end part of the tip-end side nozzle part 12. Thereby, the valve main body 21 can swing between a position which is in contact with a lower surface of the upper wall 12a of the tip-end-side nozzle part 12 and a position which is in contact with the upper surface of a lower wall 12b of the tip-end-side nozzle part 12 so that the tip end part makes vertical motions in the opening 15 of the tip-end-side nozzle part 12.

In this case, since the hinge shafts 22 and 22 are held around the upper wall 12a of the tip-end-side nozzle part 12, when the tip end part is in contact with the upper wall 12a of the tip-end-side nozzle part 12, as shown in FIG. 7, the upper surface of the valve main body part 21 is entirely in contact with the lower surface of the upper wall 12a of the tip-end-side nozzle part 12. Accordingly, a space having substantially even thickness is formed between the lower surface of the valve main body part 21 and the upper surface of the lower wall 12b of the tip-end-side nozzle part 12. This space is a space formed below the valve main body part 21, and configures a discharging path (a lower space) 17 communicated with the pressure water chamber 13. Since the valve body storing chamber 14 is formed to have the width gradually increasing toward the tip end, this discharge path 17 is also formed to have a width gradually increasing toward the tip end.

In a state in which the entire upper surface of the valve main body part 21 is in contact with the lower surface of the upper wall 12a of the tip-end-side nozzle part 12 as shown in FIG. 7, the tip end of the discharge path 17 is open between the lower surface of the valve main body part 21 and the upper surface of the lower wall 12b of the tip-end-side nozzle part 12, and a discharging opening (the lower opening of the present invention) 17a is formed. A channel cross-sectional area of the discharging opening 17a is formed to be a smaller cross-sectional area than a maximum channel cross-sectional area of the pressure water chamber 13.

FIG. 7 is a state in which the valve main body part 21 is disposed in the upper part of the valve body storing chamber 14, so that the valve body storing chamber 14 and the opening 15 are respectively small since the valve main body part 21 occupies there and form the discharge path 17 and the discharging opening 17a; therefore, the discharge path 17 and the discharging opening 17a are denoted in parentheses.

The closing part 23 projects outward (in a discharging direction of the pressure water) from the valve body storing chamber 14 of the tip-end-side nozzle part 12 and is formed in a state in which the tip end part of the valve main body part 21 is bended upward. The closing part 23 is formed over the entire width of the valve main body part 21, and a height thereof is formed to be larger than a height of the valve body storing chamber 14. When the valve main body part 21 is in contact with the upper surface of the lower wall 12b of the tip-end-side nozzle part 12 (when the discharging opening 17a is closed), the closing part 23 is located in the vicinity of a front of an opening (hereinafter, it is called as an upper side opening) 18a of an upper space 18 formed between the upper surface of the valve main body 21 and the lower surface of the upper wall 12a of the tip-end-side nozzle part 12. Accordingly, a state in which the closing part 23 closes the upper opening 18a can be made. The upper opening 18a is an opening formed between the upper surface of the valve main body 21 and the lower surface of the upper wall 12a of the tip-end-side nozzle part 12 by locating the valve main body part 21 among the opening 15 of the valve body storing chamber 15 to be in contact with the upper surface of the lower wall 12b of the tip-end-side nozzle part 12.

The sinkers 24 are made of disk-shaped stainless steel or the like, and provided two on the upper surface of the valve main body 21 with maintaining a prescribed interval via screws 25. On the lower surface of the upper wall 12a of the tip-end-side nozzle part 12, a depressed part 26 is formed, so that it is planned that the sinkers 24 can be retracted in the depressed part 26 on the upper wall 12a when the valve main body part 21 is in contact with the upper wall 12a of the tip-end-side nozzle part 12 (refer to FIG. 7).

Accordingly, even though the sinkers 24 are provided to project from the upper surface of the valve main body part 21, the sinkers 24 are disposed inside the depressed part 26 when the valve body 20 moves upward, so it is possible to maintain a sufficient opening area of the discharging opening 17a. The weight of the sinkers 24 is decided in a range in which the valve main body part 21 is rotated in a counter-clockwise direction in FIG. 7 around the hinge shaft 22 when the pressure water is supplied to the nozzle main body 10; or a range in which it can rotate in a clockwise direction if FIG. 7 by the weight of the valve main body part 21 including the sinkers 24 when the supply of the pressure water is stopped.

The valve body 20 composed of the above-described structure is rotated upward around the hinge shafts 22 and 22 by the water pressure as shown in FIG. 7 when the pressure water is supplied to the spout nozzle N from the pressure water supply pipe which is not illustrated. Accordingly, the discharge path 17 and the discharging opening 17a can be opened communicating with the pressure water chamber 13 between the valve body 20 and the lower wall 12b of the tip-end-side nozzle part 12.

When the pressure water is not supplied to the spout nozzle N, as shown in FIG. 8, the valve main body part 21 is rotated downward around the hinge shafts 22 and 22 by its own weight. Accordingly, the valve main body part 21 is brought into contact with the lower wall 12b of the tip-end-side nozzle part 12 to close the discharging opening 17a; meanwhile, the upper opening 18a formed above the valve main body 21 is closed by the closing part 23. Therefore, the opening 15 of the tip-end-side nozzle part 12 is entirely closed.

Although the valve body 20 of the above structure is provided with two sinkers 24 formed of stainless steel or the like having a disk shape so as to increase the weight of the valve main body part 21, the sinker can be one rectangular strip. In a case in which the valve body 20 itself has a sufficient weight, for example, in a case in which the valve main body part 21 and the closing part 23 are formed of stainless steel or the like, the sinkers 24 can be omitted. However, when the parts of the nozzle main body 10 except for the sinkers 24 and the screws 25 are made of synthetic resin, it is preferable to provide the sinker 24 to make sure to move the valve main body 21.

Moreover, the spout nozzle N having the above-described structure can be easily made of synthetic resin. In this case, the part of the upper wall 12a of the tip-end-side nozzle part 12 with which the valve body 20 is assembled is open, and the open part is closed after the valve body 20 is assembled within the tip-end-side nozzle part 12.

Spout operation of the pressure water of the spout nozzle N having the above-described structure will be explained. When the pressure water is supplied to the pressure water chamber 13 through the installing part 16, the supplied pressure water is once stored in the pressure water chamber 13. Then, the pressure water in the pressure water chamber 13 is supplied to the valve body storing chamber 14 having a channel cross-sectional area smaller than that of the pressure water chamber 13.

In the valve body storing chamber 14 in the tip-end-side nozzle part 12, since the base end of the valve body 20 is held on the upper wall 12a of the tip-end-side nozzle part 12, in the base end part of the valve main body 21, the lower surface thereof is separated from the lower wall 12b of the tip-end-side nozzle part 12. Therefore, the pressure water flows to the tip end direction while pressing the lower surface of the valve main body part 21 to push up the tip end of the valve main body part 21 and bring it into contact with the lower surface of the upper wall 12a of the tip-end-side nozzle part 12.

Accordingly, the discharge path (lower space) 17 is formed between the lower surface of the valve main body part 21 and the upper surface of the lower wall 12b of the tip-end-side nozzle part 12; and the pressure water flows through the discharge part 17 and is discharged from the discharging opening (lower opening) 17a. Since the discharging opening 17a is formed to have a smaller cross-sectional area than the maximum channel cross-sectional area of the pressure water chamber 13, the pressure water is spouted with great force. The discharge path 17 has a flat shape gradually spread out toward the discharging opening 17a; the pressure water is discharged to spread in the horizontal direction.

The direction (refer to the arrow "d" in FIG. 7) of the water flow of the pressure water discharged from the discharging opening 17a is slightly upward with respect to the direction (refer to the arrow "c" in FIG. 7) of the water flow of the pressure water supplied from the pressure water chamber 13 through the installing part 16 in accordance with the inclination of the tip-end-side nozzle part 12. Generally, when the spout nozzle N is provided at the water conduit 1, the pressure water chamber 13 of the nozzle main body 10 is provided so as to be maintained to be horizontal; so that the water flow slightly upward (at an angle about 20° to the horizontal) with respect to the horizontal is discharged from the discharging opening 17a of the tip-end-side nozzle part 12.

Next, the operation of removing scum in the water conduit 1 provided with the spout nozzle N composed of the above-described structure will be explained.

The raw water (sewage) is supplied in the water conduit main body 2 and the supplied raw water is divided and supplied through the flow inlets 7 provided for the respective sedimentation basins 6, so that the scum S is gradually generated on the water surface. In this condition, since the pressure water is not supplied to the spout nozzle N, the valve body 20 of the valve body storing chamber 14 is in contact with the lower wall 12b of the tip-end-side nozzle part 12 and the upper opening 18a formed above the valve body 20 is closed by the closing part 23. Accordingly, it is prevented that the water flows in the upper side and the lower side of the valve main body part 21 from exterior, so that inconvenience in which the inside the nozzle body 10 is stained by the scum and the like contained in the water can be effectively prevented. FIG. 2 and FIG. 8 show this condition.

At the point when the generation of the scum S advances to a certain degree so that the thickness thereof achieves about 10 cm, the pressure water is supplied to the spout nozzle N. The pressure water is also supplied to the water jet nozzles 8; and the compressed air is supplied to the air spout devices 9. Accordingly, the operation of discharging the scum S to the scum pit 3 starts.

By supplying the pressure water to the spout nozzle N, the valve main body part 21 is rotated around the hinge shafts 22 and 22 by the water pressure by this supply of the pressure water. Accordingly, the closing part 23 moves upward and can open the discharging opening 17a. From the open discharging opening 17a, the pressure water is spouted so that the scum S flow to the scum pit 3 side. The spouting direction of the pressure water from the discharging opening 17a act to slightly lift up the scum S since the inclination of the tip-end-side nozzle part 12 of the nozzle body 10 is formed slightly upward, and the movement of the scum S is performed smoothly.

At the same time, the pressure water is spouted out also from the water jet nozzles 8 so as to flow the scum S to the scum pit 3 side. Furthermore, since the scum S adhered on the side wall 5 is removed by the air spouted from the air spout devices 9, the scum S is discharged to the scum pit 3 more smoothly and quickly. FIG. 3 and FIG. 7 shows this condition.

When most of the scum S is discharged from the water conduit main body 2, the supply of the pressure water to the spout nozzle N, and the water jet nozzles 8 is stopped, and the supply of the compressed air to the air spout device 9 is stopped. Accordingly, the discharging operation of the scum S to the scum pit 3 is terminated.

For the discharging operation of the above-described scum S to the scum pit 3, the water jet nozzles 8 and the air spout devices 9 were both used; however, either one may be used. It is decided whether both are used or either one is used according to characteristic and the like of the generated scum S.

The operation starting or stopping the discharge of the above-described scum S to the scum pit 3 can be automatically carried out; however, since the scum S is not evenly generated according to water quality and the like of the raw water flowing in the water conduit main body 2, it is decided by experiments. That is, it is desirable to observe the discharging condition of the scum S by manually operating for a first few days of driving the equipment to decide. Then, the automatic operation is carried out according to the observation result. However, the automatic operation is not limited to the above-described example; it may be carried out according to detection signals by detecting the thickness of the scum S generated in the water conduit main body 2 by a sensor.

The spout nozzle according to the present invention was explained above referring drawings; however, the specific structure is not limited to the above embodiment example, but the design and the like can be modified without departing from the summary of the present invention.

For example, in the above example, the spout nozzle N was applied on the water conduit 1 in the sewage treatment plant; however, it may be applied on a first sedimentation basin or a final sedimentation basin in the sewage treatment plant or a sedimentation basin for industrial waste water. In this case, without stirring the water in the sedimentation basin uselessly, to help the flow which can move the surface layer water where the scum S floats to a scum discharging device side such as a pipe skimmer, the power of the water spouted from the discharging opening 17a is adjusted. That is, the pressure of the pressure water supplied to the spout nozzle N is adjusted and the power of the water spouted from the discharging opening 17a is adjusted.

The spout nozzle N according to the present invention can be applied for a recovery tank for recovering valuables by floatation separation. In a case of this recovery tank, the scum S of the present invention corresponds to the valuables. Moreover, there is a case in which the fluid is not water. Accordingly, the "scum" of the present invention contains such valuables, and the "water" contains such liquid.

INDUSTRIAL APPLICABILITY

It can be appropriately used for a scum removal device located on a final sedimentation basin and the like in the sewage treatment plant.

REFERENCE SIGNS LIST

1 Water conduit
2 Water conduit main body
3 Scum pit
4 Movable gate
5 Side wall
6 Sedimentation basin
7 Flow inlet
8 Water jet nozzle
9 Air spout device
S Scum
N Spout nozzle for scum removal device (Spout nozzle)
10 Nozzle body
11 Inlet-side housing part
12 Tip-end-side nozzle part
12a Upper wall
12b Lower wall
13 Pressure water chamber
14 Valve body storing chamber
15 Opening
16 Installing part
17 Discharge path (Lower space)
17a Discharging opening (Lower opening)
18 Upper space
18a Upper opening
20 Valve body
21 Valve main body part
22 Hinge shaft
23 Closing part
24 Sinker
25 Screw
26 Depressed part

The invention claimed is:

1. A spout nozzle for a scum removal device which removes scum by spouting pressure water in water where the scum floats, comprising a nozzle body having an inlet-side housing part into which the pressure water is supplied, and a tip-end-side nozzle part communicated with the inlet-side housing part and formed into a flat cylindrical shape in which a width is larger than a height, and a valve body provided in the tip-end-side nozzle part of the nozzle body and can open/close an opening of the tip-end-side nozzle part, wherein the valve body has a valve main body part formed in a plate shape; a base end part of the valve main body part is rotatably held on a vicinity of an upper wall of a base end part of the tip-end-side nozzle part via a hinge shaft along the width direction; a tip end of the valve main body part is arranged in the opening of the tip-end-side nozzle part, with being vertically movable between a position of forming an upper opening above the valve main body part by being in contact with an upper surface of a lower wall of the tip-end-side nozzle part and a position forming a lower opening below the valve main body part by being in contact with a lower surface of an upper wall of the tip-end-side nozzle part; the valve main body part has a weight of being rotated downward by its own weight and close the lower opening when the pressure water is not supplied to the inlet-side housing part and of being rotated upward by a pressure of the pressure water and open the lower opening when the pressure water is supplied, a closing part is provided at the tip end part of the valve main body part to stand up upward at a position of protruding from the opening, the closing part is formed in size of closing the upper opening formed between the valve body and the lower surface of the upper wall of the tip-end-side nozzle part when the valve body closes the lower opening.

2. The spout nozzle for a scum removal device according to claim 1, wherein the tip-end-side nozzle part and the valve body are formed in a shape in which width is gradually larger toward the opening.

3. The spout nozzle for a scum removal device according to claim 1, wherein the lower opening has a channel cross-sectional area smaller than a maximum channel cross-sectional area of the inlet-side housing part.

4. The spout nozzle for a scum removal device according to claim 1, wherein the nozzle body and the valve body are formed from synthetic resin and the valve body is provided with a sinker.

5. The spout nozzle for a scum removal device according to claim 1, wherein the tip-end-side nozzle part inclines to turn the opening diagonally upward regarding a horizontal direction.

6. A water conduit comprising:

a spout nozzle for a scum removal device which removes scum by spouting pressure water in water where the scum floats, comprising a nozzle body having an inlet-side housing part into which the pressure water is supplied, and a tip-end-side nozzle part communicated with the inlet-side housing part and formed into a flat cylindrical shape in which a width is larger than a height, and a valve body provided in the tip-end-side nozzle part of the nozzle body and can open/close an opening of the tip-end-side nozzle part, wherein the valve body has a valve main body part formed in a plate shape; a base end part of the valve main body part is rotatably held on a vicinity of an upper wall of a base end part of the tip-end-side nozzle part via a hinge shaft along the width direction; a tip end of the valve main body part is arranged in the opening of the tip-end-side nozzle part, with being vertically movable between a position of forming an upper opening above the valve main body part by being in contact with an upper surface of a lower wall of the tip-end-side nozzle part and a position forming a lower opening below the valve main body part by being in contact with a lower surface of an upper wall of the tip-end-side nozzle part; the valve main body part has a weight of being rotated downward by its own weight and close the lower opening when the pressure water is not supplied to the inlet-side housing part and of being rotated upward by a pressure of the pressure water and open the lower opening when the pressure water is supplied, a closing part is provided at the tip end part of the valve main body part to stand up upward at a position of protruding from the opening, the closing part is formed in size of closing the upper opening formed between the valve body and the lower surface of the upper wall of the tip-end-side nozzle part when the valve body closes the lower opening.

7. The water conduit according to claim 6, wherein a water conduit body and a scum pit are provided to be connected to each other, and the water conduit body is provided with at least either one of a water spout nozzle spouting pressure water toward an upper surface of a generated scum layer to help a flow of the scum layer toward the scum pit, and an air jet mechanism which jets out compressed air toward the scum layer from a lower position than the scum layer and an inner of a side wall of the water conduit body.

8. The spout nozzle for a scum removal device according to claim 1, wherein the tip end part is bent upward with respect to the valve main body part, and the tip end part has a height greater than the height of a valve body storing chamber of the spout nozzle.

9. The spout nozzle for scum removal device according to claim 1, wherein the closing part of the tip end part is bent upward with respect to the main body part and is configured to move:

from an open position, wherein the main body part is pivoted upward and touches the lower surface of the upper wall with the tip end extending above the upper wall and a discharge opening of the spout nozzle; and a closed position, wherein the main body part is pivoted downward and contacts the upper surface of a lower wall and with the tip end at a lower position than in the open position to close-off the discharging opening.

10. The water conduit of claim 6, wherein the tip end part is bent upward with respect to the valve main body part, and the tip end part has a height greater than the height of a valve body storing chamber of the spout nozzle.

11. The water conduit of claim 6, wherein the closing part of the tip end part is bent upward with respect to the main body part and is configured to move:

from an open position, wherein the main body part is pivoted upward and touches the lower surface of the upper wall with the tip end extending above the upper wall and a discharge opening of the spout nozzle; and a closed position, wherein the main body part is pivoted downward and contacts the upper surface of a lower wall and with the tip end at a lower position than in the open position to close-off the discharging opening.

\* \* \* \* \*